Dec. 13, 1938.   E. GREENWOOD ET AL   2,139,821
COMBINATION METER AND TIME SWITCH
Filed May 8, 1936   2 Sheets-Sheet 1

Inventors:
Earle Greenwood
Karl W. Struck
By: Brown Jackson, Boettcher Dienner
Attys.

Dec. 13, 1938. E. GREENWOOD ET AL 2,139,821
COMBINATION METER AND TIME SWITCH
Filed May 8, 1936  2 Sheets-Sheet 2

Inventors:
Earle Greenwood
Karl W. Struck
By: Brown, Jackson, Boettcher & Dienner.
Attys.

Patented Dec. 13, 1938

2,139,821

UNITED STATES PATENT OFFICE 2,139,821

COMBINATION METER AND TIME SWITCH

Earle Greenwood and Karl W. Struck, Springfield, Ill., assignors to Sangamo Electric Company, Springfield, Ill., a corporation of Illinois Application May 8, 1936, Serial No. 78,628

8 Claims. (Cl. 171—268)

Our invention relates generally to electric metering and control devices, and it has particular relation to a combined watthour meter and time controlled switch.

From the standpoint of the utility company, it is desirable that its electric power system be operated at substantially full capacity at all times in order to obtain the maximum efficiency and economy of operation. Since it is necessary to provide a system having a capacity as great or greater than any power demand that will be made on it, any operation at other than maximum capacity entails a certain degree of loss. While a certain number of generating units may be shut down during off-peak periods of consumption, the transmission system connecting the power station and the consumers cannot be similarly taken out of service. The number of operating personnel will be about the same regardless of the load carried by the system. It is therefore desirable to increase the load supplied by the system, particularly during the off-peak periods of the twenty-four hours of the day.

With a view to increasing the off-peak load, such as the load carried by the power system during the late evening and early morning hours, preferential rates are provided so that users of power during the off-peak periods will have an incentive to use still more power. In many cases, electric water heaters, electric furnaces, and other load devices requiring relatively large amounts of power are not used because of the normally prohibitive cost of the energy consumed. However, such devices can often be operated satisfactorily during the off-peak hours, and consequently a preferential rate can economically be given for energy used during such intervals resulting in an increased use of power with a saving to the consumer and a gain to the utility company.

Since most consumers of electric power require that it be available for use during the entire twenty-four hours of the day, it is necessary that a measuring device be provided which will differentiate between the energy consumed during the off-peak hours and the energy that is consumed during the remainder of the day so that appropriate charges may be made and the desired distribution of loads may be maintained. It is, therefore, an object of our invention, generally stated, to provide an electric power and control device which will be simple, efficient, and accurate in operation, and which may be readily and economically manufactured and installed.

The principal object of our invention is to provide separate indications of the electrical energy flowing in a circuit during different intervals.

An important object of our invention is to provide for connecting a load device to an electric power circuit during a predetermined interval of the day and separately indicating the energy consumed during the interval by a meter which also indicates the energy consumed during the remainder of the day.

Another important object of our invention is to provide for closing and opening an electric control switch with a snap action at predetermined times during a day.

A further object of our invention is to provide for closing and opening an electric control switch with a snap action to control the energization of a load device from an electric circuit during a predetermined interval of the day and for measuring the energy consumed during the interval on one register of a watthour meter and the energy consumed during the remainder of the day on another register of the watthour meter.

A more specific object of our invention is to provide a combined control and meter device for connecting and disconnecting a load device to and from an electric circuit at predetermined times during a day, and simultaneously shifting the wattmeter mechanism from driving engagement with one register of a watthour mechanism to another register of the watthour mechanism to provide separate indications of the energy consumed during the different intervals.

Other objects of our invention will, in part, be obvious and, in part, appear hereinafter.

Our invention, accordingly, is disclosed in the embodiment hereof shown in the accompanying drawings, and it comprises the features of construction, combination of elements, and arrangement of parts which will be exemplified in the construction hereinafter set forth, and the scope of the application of which will be indicated in the appended claims.

For a more complete understanding of the nature and scope of our invention, reference may be had to the following detailed description, taken in connection with the accompanying drawings, in which.

Figure 1:
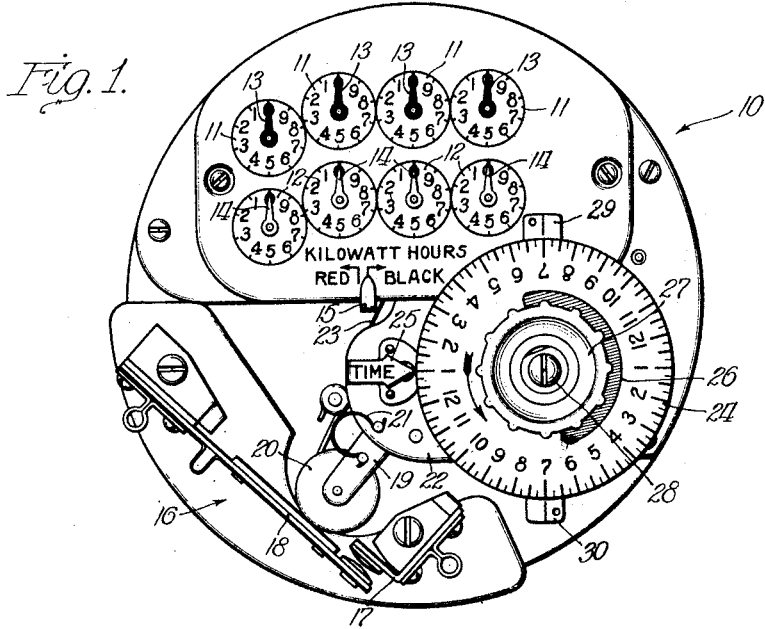
Figure 1 is a view, in front elevation, of a control and metering device constructed in accordance with our invention, the customary glass cover being removed.

In order to provide a device which will individually register the different amounts of energy that are consumed during different intervals of a day, and to permit the connection to a power circuit of a certain load device only during certain predetermined intervals, we have arranged to selectively drive one of two registers by means of a single wattmeter mechanism. Associated with the wattmeter mechanism is an electric control switch and an electric clock mechanism. The electric clock mechanism is arranged to effect the operation of the electric control switch from one circuit controlling position to another at presettable times during the day. At the same time that the control switch is operated, the driving connection from the wattmeter mechanism is shifted from one of the registers to the other so that the energy which is consumed while the electric control switch is closed will be registered on one set of dials, while the energy which is consumed while the control switch is open will be registered on another set of dials.

With a view to differentiating between the two types of energy consumption, the two registers may be provided with differently colored pointers so that it will be readily possible to observe the different indications afforded thereby. The pointers of each register are arranged to be driven by individual gear trains that may be selectively placed in driving engagement with the wattmeter mechanism by means of a gear shifter.

An electric clock mechanism is arranged to operate the electric control switch from one position to the other with a snap action, thereby reducing the arcing between the contact members thereof to a minimum. This action is effected through the agency of an over-center spring which is slowly stretched by the clock mechanism during a predetermined interval until, at a time which may be adjusted as may be desired, the spring is released and causes the switch to be moved from one circuit controlling position to the other.

The change in driving connection between the wattmeter mechanism and the registers is effected simultaneously with the movement of the electric control switch from one circuit controlling position to the other. For example, at the time that the control switch is operated to the circuit closing position, the wattmeter mechanism is connected in driving engagement with the register having the red pointers. It will then be understood that as long as the control switch remains in the closed position, the energy that is consumed in the circuit to which the wattmeter mechanism is connected will be registered on the dials having the red pointers associated therewith. Not only will the energy which is consumed by the device or devices under the control of the control switch be registered on this set of dials, but also any other energy which is consumed in the circuit at this time. At the end of the interval the control switch is returned to the open position and, at the same time, the other register is placed in driving engagement with the wattmeter mechanism. During the next interval the energy which is consumed in the circuit will be registered on the other set of dials. Presumably, the energy which is registered on these dials must be paid for at a higher rate than the rate which is paid for the energy that is registered on the other set of dials. There is, therefore, an incentive for the consumer to use more power during the off-peak hours when he will obtain the benefit of the lower rates.

Referring now particularly to Figure 1 of the drawings, it will be observed that the reference character 10 designates, generally, an electric meter and control device constructed according to our invention. The energy which is consumed in the circuit to which the wattmeter mechanism is connected may be registered either on a set of dials 11 or an alternative set of dials 12. Each set of dials 11 and 12 has associated therewith respectively, pointers 13 and 14. Since it is desirable to be able to readily differentiate between the two sets of dials, the pointers 13 and 14 may be of different color. For example, the pointers 13 may be painted black, while the pointers 14 may be painted red. A target 15 is provided underneath the dials, as indicated, for providing an indication of the register which is in driving engagement with the wattmeter mechanism at any particular time.

With a view to permitting the connection of a load device to the circuit during a predetermined interval, corresponding to off-peak time of operation of the power system, a switch, shown generally at 16, is provided in the device and is mounted on the wattmeter mechanism. The switch 16 comprises a fixed contact member 17 and a cooperating movable contact member 18 which may be carried by any suitable resilient means that will normally tend to close the contact members and complete the circuit connected therethrough. It will be understood, however, that any other suitable type of switch may be used. The switch 16 may be operated from one circuit controlling position to the other by means of a switch operating lever 19 which is pivotally mounted as will be described in detail hereinafter. At the lower end of the switch operating lever 19 a roller 20 is provided, preferably composed of an insulating material, for engagement with the movable contact member 18 as indicated. An auxiliary overcenter spring 21 is provided for biasing the switch operating lever 19 relative to a frame plate 22, so that the switch operating lever will remain in either position to which it has been operated until it is moved to the opposite position as will be set forth hereinafter. At the same time that the switch operating lever 19 is moved from one position to another, the target 15 is also moved by means of a connecting wire 23 which moves not only the target 15 but also certain other mechanism for changing the driving connection between the wattmeter mechanism and the two registers.

With a view to affording an indication of time to permit adjusting the device for operation during certain intervals, a time dial 24 is provided having the circumference graduated as indicated for the twenty-four hours of the day. An index finger 25 which is arranged to cooperate with the scale on the time dial 24 indicates the time at any particular instant. The shaded portion 26 on the time dial 24 indicates the hours from six o'clock in the evening until six o'clock in the morning. A dial nut 27 is provided for securing the time dial 24 on a shaft 28 at any desired location. In order to effect the movement of the switch operating lever 19 from one position to the other, an "on" operating arm 29 and an "off" operating arm 30 may be provided underneath the time dial 24 for rotation with the shaft 28. The position of the arms 29 and 30 relative to the scale on the time dial 24 indicates the time that the switch 16 will be operated from one position to the other. It will be understood that the ends of the operating arms 29 and 30 may be provided with a suitable color indicating the function which they are disposed to perform. For example, the "on" operating arm 29 may be colored red corresponding to the red colored pointers 14 and indicating that the time setting corresponding thereto on the time dial 24 is the time at which the lower set of dials show the energy consumed while the switch 16 is closed. In like manner, the end of the "off" operating arm 30 may be colored black to indicate that at the corresponding time the upper set of dials 11 will indicate the energy consumed during the next interval.

Figure 2:
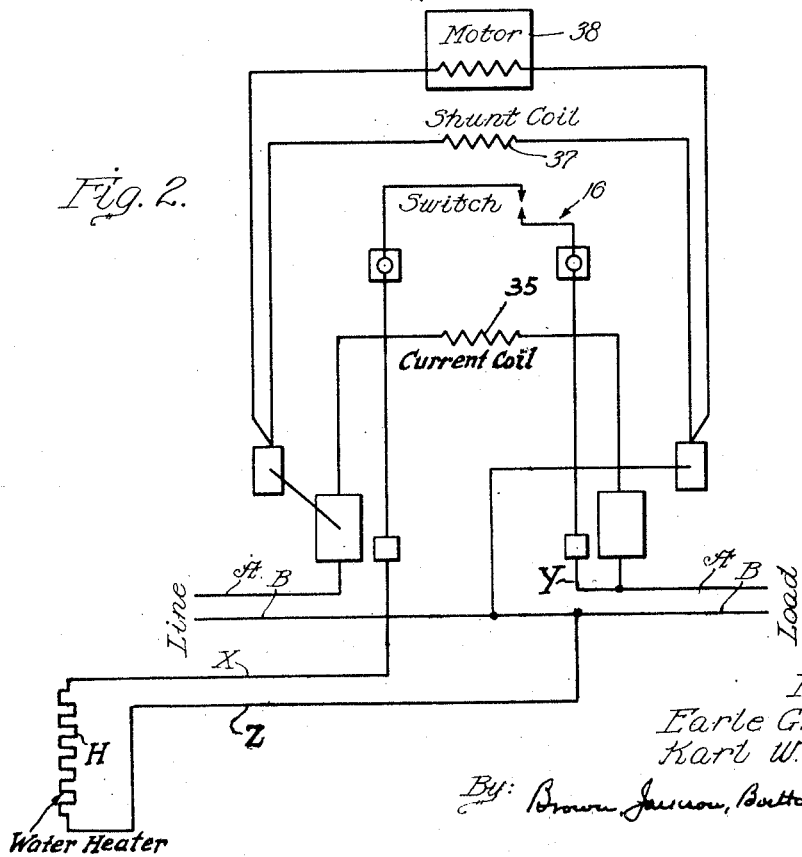
Figure 2 illustrates diagrammatically the circuit connection which may be used in applying our novel control and meter device to a three-wire circuit.

The circuit connections which may be used are illustrated in Figure 2 of the drawings. As there shown, the meter and control device 10 is arranged for connection in a two-wire circuit comprising conductors A and B. A current coil 35 is connected in conductor A for measuring the current flow therethrough. The circuit voltage is measured by a shunt coil 37 which is connected across the conductors A and B. It will be understood that these meter connections are merely illustrative, and that the meter may be connected for operation to other types of circuits.

The electric control switch 16 is illustrated diagrammatically in Figure 2 of the drawings, and conductors X and Y are provided exterior of the device for connection to any suitable control circuit. For example, the conductors X and Y may be arranged to either directly or indirectly control the connection of a load device, such as a water heater, to the conductors A and B, as will be readily understood. As illustrated, the conductor X may be connected to one terminal of a water heater H, represented by a resistor, while the other conductor Y is connected to the conductor A on the load side. A conductor Z connects the other terminal of the water heater H to the conductor B. The time at which the switch 16 is operated may be controlled by means of an electric clock mechanism 38, the motor of which may be connected for energization, as illustrated, across the conductors A and B.

Figure 3:
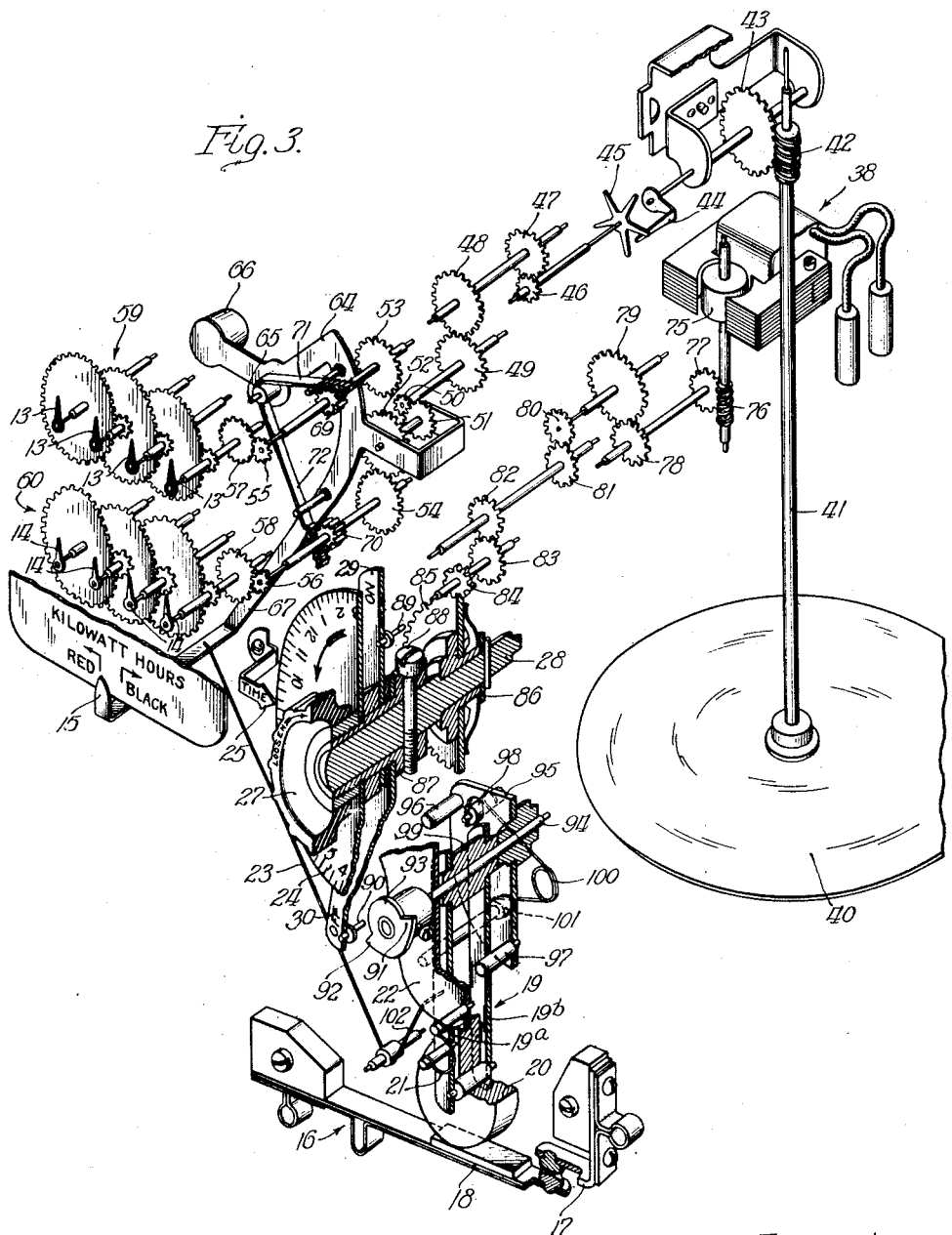
Figure 3 is an exploded view illustrating somewhat diagrammatically the mechanical relationship of the various elements and parts forming a preferred embodiment of our invention.

In order to more clearly set forth our invention, the relationship of the wattmeter mechanism to the two registers and to the electric clock controlled mechanism and switch, and the various elements forming these devices are illustrated in Figure 3 of the drawings. It will be understood that the relationship of the various elements, as there shown, is somewhat diagrammatic. In order to avoid confusion and to reduce complications to a minimum, only the elements necessary to illustrate the invention have been shown. Since the operating mechanism of the wattmeter is old and well known, it is not illustrated in detail in this figure or described herein.

As shown in Figure 3 of the drawings, a disc 40 is provided and is arranged to rotate at a speed which is proportional to the current and voltage of the circuit to which the wattmeter mechanism is connected. The disc 40 is mounted on a shaft 41 which has at its upper end a worm 42 disposed in driving engagement with a worm wheel 43. The worm wheel 43 drives a dog 44 which engages a star wheel 45 that, in turn, drives a gear train comprising gear wheels 46, 47, 48 and 49 terminating in a pinion 50. The pinion 50 is disposed in driving engagement with a gear wheel assembly comprising gear wheels 51 and 52 that are mounted for rotation on the same shaft. The gear wheel 52 is disposed to engage either a gear wheel 53 or a gear wheel 54 for driving pinions 55 and 56, respectively, depending upon which of the gear wheels 53 or 54 is in driving engagement with the gear wheel 52. The pinions 55 and 56 are positioned in driving engagement with gear wheels 57 and 58 of gear trains 59 and 60, respectively, which are associated with the pointers 13 and 14 to form the two registers by means of which the energy flowing in the electric circuit may be selectively registered, depending upon the time during which it is used.

In order to transfer the driving engagement of the gear train driven directly by the disc 40 from one of the registers 59 to the other 60, a gear shift lever 64 is provided which is pivoted at 65 and which is provided with a weight 66 for normally biasing it in one direction. A downwardly and outwardly extending arm 67, carried by the gear shift lever 64, is provided for supporting the target 15 which constitutes an upturned extension thereof and to provide an engagement with the operating wire 23. As shown in the drawings, the gear shift lever 64 has been moved by the operating wire 23 against the biasing force of the weight 66 to cause the gear wheel carried thereby to engage with the gear wheel 54. On release of the connecting wire 23 from engagement with the lower outwardly extending arm 67, the weight 66 will cause the gear shift lever 64 to turn in a counter-clockwise direction, thereby effecting driving engagement between the gear wheel 52 and the gear wheel 53. It will be understood that, in either position of the gear shift lever 64, the gear wheel 51 is in driving engagement with the pinion 50.

It is desirable to permit operation of the gear trains 59 and 60 only during such time when the disc 40 is in driving engagement therewith. As soon as the driving connection is released, no further movement of the gear trains should take place, since such operation would provide a false indication of the energy consumed. In order to insure that the register not having driving connection with the disc 40 is not permitted to rotate while the other gear train is being driven, the shafts on which the gear wheels 53 and 54 are mounted are provided with cog wheels 69 and 70 with which the corrugated ends of spring arms 71 and 72, carried by the gear shift lever 64, are disposed to engage, depending upon the position of the gear shift lever 64. In the position shown, since the gear train 59 is not in driving connection with the disc 40, the spring arm 71 is in engagement with the cog wheel 69 while the spring arm 72 is out of engagement with the cog 70.

With a view to providing for the selective operation of the combined meter and control device during predetermined intervals of the day, the motor 38 is provided as set forth hereinbefore. As shown in Figure 3 of the drawings, the motor 38 is provided with a rotor 75 which is arranged to rotate a worm 76 that is disposed in driving engagement with a worm wheel 77. As shown, the worm wheel 77 is arranged to drive a gear train comprising gear wheels 78, 79, 80, 81, 82, 83, and a pinion 84 is disposed in driving engagement with a center gear wheel 85 that is mounted on the shaft 28 and is arranged to rotate therewith through the agency of a slip clutch mechanism 86. The gear reduction between the motor 38 and the center gear wheel 85 is such that the center gear wheel rotates once during twenty-four hours.

Mounted on the shaft 28 is a hub 87 which may be secured thereto by means of a screw 88 which extends transversely through the hub 87 and the shaft 28 as illustrated. It will be observed that the operating arms 29 and 30 and the time dial 24 are mounted for rotation with the hub 87 on the shaft 28 and are held in non-rotative engagement relative thereto by means of the dial nut 27. By loosening the dial nut 27 it is possible to adjust the relative position of the operating arms 29 and 30 to effect the operation of the control switch 16 from one circuit control position to another at any desired time during the day, within certain limits, as will be set forth hereinafter. Since the shaft 28 is connected to the center gear wheel 85 through the slip clutch assembly 86, the time dial 24 may be adjusted by turning the dial nut 27 to indicate the exact time.

It will be observed that the operating arms 29 and 30 carry inwardly projecting pins 89 and 90, respectively. The pins 89 and 90 are placed at different radial distances from the shaft 28 in order to selectively engage the projections 91 and 92, respectively, of a cam 93 which is mounted for rotation with a shaft 94 in the frame plate 22. An operating sector 95 is mounted for rotation with the shaft 94 and is provided with outwardly extending pins 96 and 97 and an inwardly extending pin 98. It will be noted that the switch operating lever 19 comprises a pair of arms 19a and 19b which are mounted for rotation about the shaft 94 on a hub 99. Depending upon the direction of rotation of the operating sector 95, one or the other of the pins 96 or 97 engages the switch operating lever 19 to move it in a corresponding direction.

Since the shaft 28, driven by the clock motor 38, rotates only once during twenty-four hours, the movement of the cam 93 by either the pin 89 or the pin 90 carried respectively by the "on" operating arm 29 and the "off" operating arm 30, and the movement of the operating sector 95 is correspondingly slow. Such movement, if directly translated to the movable contact member 18 of the electric control switch 16, would result in unsatisfactory operation thereof, due to the time required to perform the opening or closing operations and also for the reason that severe arcing would occur during such slow operation. It is, therefore, desirable to provide for a snap action of the electric control switch 16 by causing the switch operating lever 19 to be accelerated in its movement at a predetermined point for rapidly effecting the opening or closing of the contact members. For this purpose a spring 100 is provided between a fixed pin 101 carried by the frame plate 22 and the inwardly extending pin 98 carried by the operating sector 95. It will be understood that the cam 93, which is fast on the shaft 94, is rocked in one direction on engagement by the pin 90 and in the opposite direction by the pin 89, both of which move at a slow speed with the shaft 28. The operating sector 95 is correspondingly rocked in opposite directions since it is also fast on the shaft 94. The pin 98 is then rocked back and forth past a line joining the pin 101 and the shaft 94. The spring 100 is gradually stressed and is released, as soon as the pin 98 has passed slightly beyond this line in either direction, to operate the sector 95 with a snap action to the next operated position, and, by means of one or the other of the pins 96 or 97, the switch operating lever 19 is moved to either of its operated positions with a snap action. The contact members 17 and 18 will then be opened or closed with a snap action. The spring 21 serves to hold the switch arm 19 in either of these positions.

For illustrative purposes, only two operating arms 29 and 30 have been shown. It will be understood, however, that a larger number of operating arms may be used to effect the operation of the electric control switch 16 from one position to another at different times throughout the day. The operating arms must be positioned sufficiently far apart on the shaft 28 to permit the movement of the cam 93 during the interval that is required to stress the over-center spring 100 to the point where it will provide the required snap action.

At the same time that the switch operating lever 19 is moved from one position to the other, a corresponding movement takes place in the connecting wire 23. It will be noted that the lower upturned end 102 of the connecting wire 23 is disposed in engagement with the left hand side of the switch operating lever 19 for movement therewith. Thus when the switch operating lever 19 has been moved to the left to permit the closure of the contact members 17 and 18, the gear shift lever 64 is operated through the agency of the connecting wire 23 to move the gear wheel 52 carried thereby into driving engagement with the gear wheel 54. The lower gear train 60 is then operated to drive the pointers 14 with respect to the dials 12 to register thereon the energy which is used in the circuit during the time that the electric control switch 16 is closed. When the switch operating lever 19 is moved to the right to effect the opening of the contact members 17 and 18 of the electric control switch 16, the operating force is no longer applied to the connecting wire 23, and the weight 66 biases the gear shift lever 64 about the pivot 65 so that it rotates in a counter-clockwise direction and the gear wheel 52 carried thereby is moved into operative engagement with the gear wheel 53. The upper gear train 59 is then operated to move the pointers 13 to register on the dials 11 the energy which is consumed in the circuit during the time when the electric control switch 16 is in the open condition. At the same time, the corrugated end of the spring arm 72 is moved into frictional engagement with the cog 70 to prevent further rotation of the gear train 60 while the spring arm 71 is moved out of frictional engagement with the cog 69.

Since certain changes may be made in the foregoing construction and different embodiments of the invention may be made without departing from the scope thereof, it is intended that all matter shown in the accompanying drawings or described hereinbefore shall be interpreted as illustrative and not in a limiting sense.

We claim as our invention:
1. An electric metering and control device comprising, in combination, a pair of registration mechanisms, a wattmeter mechanism disposed to be responsive to the flow of electric power in a circuit and to selectively operate said registration mechanisms to indicate the energy consumed in said circuit, a clock mechanism dis- posed to transfer the driving connection of said wattmeter mechanism from one of said registration mechanisms to the other during a predetermined time interval, and circuit control means for connecting and disconnecting a load device to said circuit and disposed to be operated from one circuit controlling position to another by said clock mechanism on shifting from operation of one registration mechanism to the other to register the power flowing in said circuit including that flowing to said load device by one of said registration mechanisms when said circuit control means is in one position and by the other registration mechanism when said circuit control means is in the other position.

2. An electric metering and control device comprising, in combination, a plurality of registration mechanisms, a wattmeter mechanism disposed to be responsive to the flow of electric power in a circuit and to selectively operate said registration mechanisms to indicate the energy consumed in said circuit, an electric clock mechanism disposed to be energized from said circuit, said electric clock mechanism being disposed to mechanically transfer the driving connection of said wattmeter mechanism from one of said registration mechanisms to the other during a predetermined time interval, and a control switch disposed to be operated from one circuit controlling position to another by said electric clock mechanism on transfer of the driving connection from one registration mechanism to the other, thereby permitting the operation of an energy consuming device under the control of said control switch during said predetermined interval during which the energy consumed in said circuit, including that consumed by said energy consuming device, is totalized by the registration mechanism then in driving connection with said wattmeter mechanism.

3. An electric metering and control device comprising, in combination, a pair of registering devices each including a set of dials having individual pointers and a gear train for moving said pointers relative to said dials; a wattmeter mechanism disposed to be responsive to the flow of electric power in a circuit, a gear train driven by said wattmeter mechanism, a gear shift lever for transferring the driving connection of said last named gear train from the gear train of one of said registering devices to the other, an electric clock mechanism disposed to be energized from said circuit, said electric clock mechanism being disposed to effect the movement of said gear shift lever from one position to the other at predetermined times, an electric control switch for connecting and disconnecting a load device to said circuit, and means for effecting the operation of said control switch from one circuit controlling position to another simultaneously with the movement of said gear shift lever from one position to the other to register the power flowing in said circuit including that flowing to said load device by one of said registering devices when said control switch is in one position and by the other register device when said control switch is in the other position.

4. An electric metering and control device comprising, in combination, registering means including a set of dials having individual pointers and a gear train for moving said dials relative to said pointers; a wattmeter mechanism disposed to be responsive to the flow of electric power in a circuit and having driving connection with said gear train for totalizing the energy consumed in said circuit, an electric control switch disposed to control the connection of an energy consuming device to said circuit, an electric clock mechanism disposed to be energized from said circuit, and snap acting operating means interconnecting said control switch and said clock mechanism to effect operation of said control switch from one control position to another at predetermined times thereby permitting operation of said energy consuming device only during predetermined intervals during which the power flowing in said circuit including that flowing to said energy consuming device is registered by said registering means.

5. An electric metering and control device comprising, in combination, a pair of registers each including a set of dials having individual pointers and a gear train for moving said pointers relative to said dials; a pinion, a wattmeter mechanism disposed to be responsive to the flow of electric power in a circuit for driving said pinion, a pivotally mounted gear shift lever, gear wheel means carried by said gear shift lever in driving engagement with said pinion and disposed to operatively engage the gear train of one or the other of said registers, an electric motor disposed to be connected to said circuit, operating means disposed to be driven by said motor at a predetermined speed, cam means disposed to be engaged by said operating means, an operating member movable with said cam means, biasing means connected to said operating member for urging it to a predetermined position with a snap action, circuit control means for effecting the connection of a load device to said circuit, means for translating the movement of said operating member to said circuit control means for operating it from one circuit control position to another, and means for simultaneously translating the movement of said operating member to said gear shift lever to shift said driving engagement for registering the power flow in said circuit, including that flowing to said load device, on one register when said load device is energized and on the other register when said load device is deenergized.

6. An electric metering and control device comprising, in combination; a pair of registers each including a set of dials having individual pointers and a gear train for moving said pointers relative to said dials; a pinion, a wattmeter mechanism disposed to be responsive to the flow of electric power in a circuit for driving said pinion, a pivotally mounted gear shift lever, a target carried by said gear shift lever for indicating the register being operated, gear wheel means carried by said gear shift lever in driving engagement with said pinion and disposed to operatively engage the gear train of one or the other of said registers, a weight carried by said gear shift lever for biasing the gear wheel means carried thereby into driving engagement with one of said gear trains, an electric motor disposed to be connected to said circuit, operating means having driving connection with said motor, cam means engageable by said operating means, an operating member movable with said cam means, resilient means connected to said operating member for biasing it with a snap action to a predetermined position, a control switch for effecting the connection of a load device to said circuit, connecting means for translating the movement of said operating member to said control switch for operating it from one position to another, and means interconnecting said connecting means and said gear shift lever for moving said gear shift lever against the biasing force of said weight to effect the operation of the other register to register thereby the power flow in said circuit including that flowing to said load device while said load device is energized.

7. An electric metering and control device comprising, in combination; a pair of registers each including a set of dials having individual pointers and a gear train for moving said pointers relative to said dials; a pinion, a wattmeter mechanism disposed to be responsive to the flow of electric power in a circuit for driving said pinion, a pivotally mounted gear shift lever, gear wheel means carried by said gear shift lever in driving engagement with said pinion and disposed to operatively engage the gear train of one or the other of said registers, an electric motor disposed to be connected to said circuit, a plurality of operating levers driven by said motor in one direction, cam means disposed to be successively engaged by said operating levers for movement thereof in opposite directions, an operating member movable with said cam means, biasing means disposed to accelerate the movement of said operating member in either direction on movement thereof to a predetermined position thereby providing a snap action, circuit control means for effecting the connection of a load device to said circuit, means for translating the movement of said operating member to said circuit control means for operating it from one circuit control position to another, and means for simultaneously translating the movement of said operating member to said gear shift lever to register on one register the power flow in said circuit when said load device is energized including that flowing to said load device and on the other register when said load device is deenergized.

8. An electric metering and control device comprising, in combination; a pair of registers each including a set of dials having individual pointers and a gear train for moving said pointers relative to said dials; a pinion, a wattmeter mechanism disposed to be responsive to the flow of electric power in a circuit for driving said pinion, a pivotally mounted gear shift lever, gear wheel means carried by said gear shift lever in driving engagement with said pinion and disposed to operatively engage the gear train of one or the other of said registers, brake means disposed to frictionally engage the gear train not having driving connection with said pinion to prevent operation thereof while the other gear train has driving engagement with said pinion, an electric clock mechanism disposed to be energized from said circuit, a pair of arms rotated by said clock mechanism in one direction, a cam disposed to be rotated in opposite directions on successive engagement by said arms during predetermined intervals, an operating plate rotatable with said cam, a main over-center spring for biasing said operating plate in either direction with a snap action on rotation thereof to a predetermined position, an electric control switch disposed to effect the connection of a load device to said circuit, a switch operating lever disposed to translate the movement of said operating plate to said control switch for separating the contact members thereof in one position and closing said contact members in the other position, means interconnecting said switch operating lever and said gear shift lever for shifting said driving engagement for registering on one register the power flow in said circuit when said load device is energized including that flowing to said load device and on the other register when said load device is denergized, and an auxiliary over-center spring for biasing said switch operating lever to either position until movement thereof to the opposite position by said main over-center spring.

EARLE GREENWOOD.
KARL W. STRUCK.